United States Patent
Oshima

(10) Patent No.: US 7,404,031 B2
(45) Date of Patent: Jul. 22, 2008

(54) MEMORY CARD, NONVOLATILE SEMICONDUCTOR MEMORY, AND METHOD OF CONTROLLING SEMICONDUCTOR MEMORY

(75) Inventor: Takashi Oshima, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 176 days.

(21) Appl. No.: 11/497,248

(22) Filed: Aug. 2, 2006

(65) Prior Publication Data

US 2006/0271729 A1    Nov. 30, 2006

Related U.S. Application Data

(63) Continuation of application No. PCT/JP2005/013894, filed on Jul. 22, 2005.

(30) Foreign Application Priority Data

Jul. 23, 2004    (JP) .............................. 2004-216361

(51) Int. Cl.
*G06F 12/00* (2006.01)
(52) U.S. Cl. ................... 711/103; 711/115; 711/154; 711/170; 711/173; 235/492
(58) Field of Classification Search ................. 711/103, 711/115, 154, 156, 170, 173; 235/492
See application file for complete search history.

(56) References Cited

U.S. PATENT DOCUMENTS

| | | | | |
|---|---|---|---|---|
| 5,579,508 | A | * | 11/1996 | Yoshizawa et al. .......... 711/172 |
| 6,542,978 | B2 | * | 4/2003 | Goldstein et al. ........... 711/170 |
| 6,718,430 | B2 | | 4/2004 | Lin et al. |
| 2001/0036109 | A1 | | 11/2001 | Jha et al. |
| 2003/0014582 | A1 | | 1/2003 | Nakanishi |
| 2004/0032789 | A1 | | 2/2004 | Ngo et al. |
| 2006/0271729 | A1 | | 11/2006 | Oshima |
| 2007/0005875 | A1 | | 1/2007 | Oshima |

FOREIGN PATENT DOCUMENTS

JP    9-198884    7/1997

OTHER PUBLICATIONS

U.S. Appl. No. 11/690,367, filed Mar. 23, 2007, Oshima et al.

* cited by examiner

*Primary Examiner*—Jack A Lane
(74) *Attorney, Agent, or Firm*—Oblon, Spivak, McClelland, Maier & Neustadt, P.C.

(57) ABSTRACT

A nonvolatile semiconductor memory includes a storage area including of a plurality of data blocks and a management block which stores management information related to a storage medium in a lump. The storage area is divided into a plurality of areas and each area has a data block containing a particular page which stores information indicating whether or not the management block is present in the area.

14 Claims, 12 Drawing Sheets

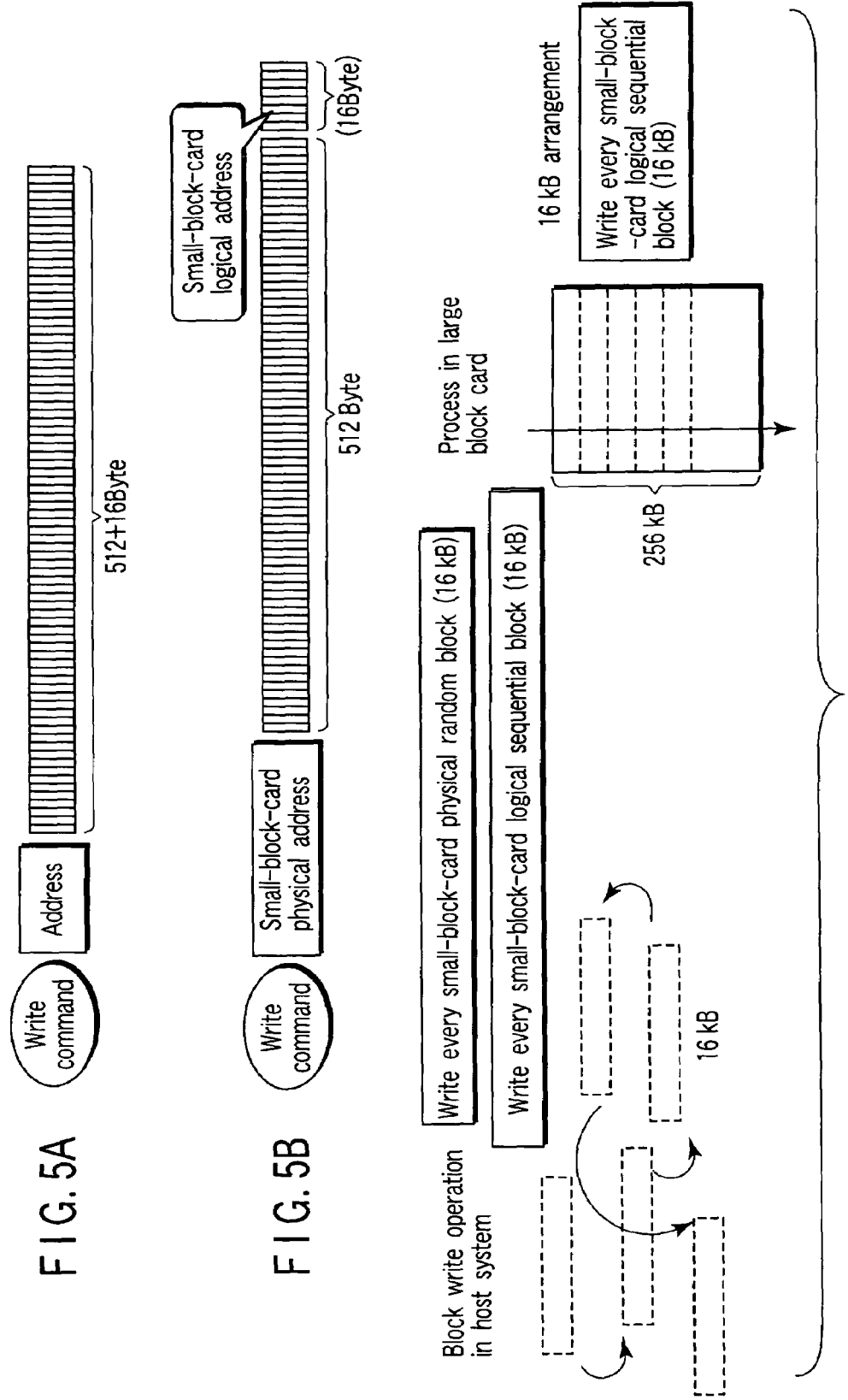

| Offset | CIS page |
|---|---|
| 0–511 | CIS 512B |
| 512–517 | Identification number 6B |
| 518–527 | ECC 10B |
| 528–1033 | Identification number 506B |
| 1034–1045 | Empty BLK 12B |
| 1046–1055 | ECC 10B |
| 1056 | Empty BLK 1B |
| 1057–1058 | CIS PBA 2B |
| 1059 | Mode 1B |
| 1060–1061 | Max PBA 2B |
| 1062 | Max PPA 1B |
| 1063–2096 | 1034B |
| 2097 | ID 1B |
| 2098–2101 | 4B |
| 2102–2111 | ECC 10B |

| Offset | Management page 0 | Management page 1 | Management page 2 | Management page 3 |
|---|---|---|---|---|
| 0–517 | Assign & Status (PBA0-2047 1/3) 518B | Assign & Status (PBA2048-4095 1/3) 518B | Assign & Status (PBA4096-6143 1/3) 518B | Assign & Status (PBA6144-8191 1/3) 518B |
| 518–527 | ECC 10B | ECC 10B | ECC 10B | ECC 10B |
| 528–1045 | Assign & Status (PBA0-2047 2/3) 518B | Assign & Status (PBA2048-4095 2/3) 518B | Assign & Status (PBA4096-6143 2/3) 518B | Assign & Status (PBA6144-8191 2/3) 518B |
| 1046–1055 | ECC 10B | ECC 10B | ECC 10B | ECC 10B |
| 1056–1573 | Assign & Status (PBA0-2047 3/3) 518B | Assign & Status (PBA2048-4095 2/3) 518B | Assign & Status (PBA4096-6143 2/3) 518B | Assign & Status (PBA6144-8191 2/3) 518B |
| 1574–1583 | ECC 10B | ECC 10B | ECC 10B | ECC 10B |
| 1584–2077 | Assign & Status (PBA0-2047) 494B | Assign & Status (PBA 2048-2047) 494B | Assign & Status (PBA 4096-6143) 494B | Assign & Status (PBA 6144-8191) 494B |
| 2078–2096 | 19B | 19B | 19B | 19B |
| 2097 | ID 1B | ID 1B | ID 1B | ID 1B |
| 2098–2101 | 4B | 4B | 4B | 4B |
| 2102–2111 | ECC 10B | ECC 10B | ECC 10B | ECC 10B |

| | Description | | Number of bytes |
|---|---|---|---|
| CIS | CIS data | | 512B |
| CIS-PBA | Holds xPBA of CIS | | 2B(10 bit) |
| Recognition number | Identification number; during read, signature area is returned with AA55h fixed | | 512B |
| ID | Type of data written in page and bad block attribute | | 1B |
| | bit 7-6 | BLK Status | |
| | | 0x00 — Bad Block | |
| | | 0x01 — Pair BLK, Reserved pair BLK | |
| | | 0x10 — Spare's spare BLK | |
| | | 0x11 — Logical assigned BLK, Spare BLK | |
| | bit 5-0 | BLK ID | |
| | | 0x3e — CIS | |
| | | 0x3d — Management page 0 | |
| | | 0x3b — Management page 1 | |
| | | 0x37 — Management page 2 | |
| | | 0x2f — Management page 3 | |
| | | 0x3c — Data page 0 | |
| | | 0x39 — Data page 1 | |
| | | 0x33 — Data page 2 | |
| Empty BLK | Store PBAs of arbitrary eight erased blocks | | 13B(8×13 bit) |
| ECC | ECCs corresponding to column addresses 0 to 517, 528 to 1045, 1056 to 1573, and 1584 to 2101 | | 10B |
| Assign & Status | Use 1 byte to indicate zone to which block is assigned and status of block<br>Management blocks are not rewritten for each held block erasure, so that data may have been erased from block even if block is assigned to any zone | | 8192B |
| | bit 7-6 | Same as status ID of block | |
| | bit 5-0 | Higher 6 bits of zone number (7 bits) in data stored in block | |

F I G. 13

MEMORY CARD, NONVOLATILE SEMICONDUCTOR MEMORY, AND METHOD OF CONTROLLING SEMICONDUCTOR MEMORY

CROSS-REFERENCE TO RELATED APPLICATIONS

This is a Continuation Application of PCT Application No. PCT/JP2005/013894, filed Jul. 22, 2005, which was published under PCT Article 21(2) in English.

This application is based upon and claims the benefit of priority from prior Japanese Patent Application No. 2004-216361, filed Jul. 23, 2004, the entire contents of which are incorporated herein by reference.

BACKGROUND OF THE INVENTION

1. Field of the Invention

The present invention relates to a memory card in which a nonvolatile semiconductor memory card is mounted, and in particular, to a memory card in which a nonvolatile semiconductor memory having a particular erase block size is mounted, and a method of controlling a semiconductor memory.

2. Description of the Related Art

In some of various memory cards, a nonvolatile memory such as a NAND flash memory comprises a management block in a predetermined area to manage various information related to the memory card (e.g., information to be transmitted to a host, information required to create an address conversion table, and information on defective blocks).

When such a memory card is powered on, the management block is retrieved and the information is read from the management block and used.

For example, Jpn. Pat. Appln. KOKAI Publication No. 9-198884 (FIG. 1 and the like) discloses a flash memory having a management block storing card management information related to a memory card.

If a nonvolatile memory such as a NAND flash memory has a storage area of a small number of blocks, the management block can be retrieved in a relatively short time. However, as the number of blocks increases consistently with the storage capacity of the nonvolatile memory, a longer time is required to retrieve the management block. Consequently, a response to a host or the like is delayed. This may prevent temporal restrictions specified for the memory card from being met.

It is thus desired to be able to quickly retrieve the management block stored in the memory.

BRIEF SUMMARY OF THE INVENTION

A nonvolatile semiconductor memory according to an embodiment of the present invention comprises a storage area including of a plurality of data blocks and a management block which stores management information related to a storage medium in a lump; and the storage area being divided into a plurality of areas and each area having a data block containing a particular page which stores information indicating whether or not the management block is present in the area.

A memory card according to an embodiment of the present invention comprises a nonvolatile semiconductor memory having a storage area including a plurality of data blocks and a management block which stores management information related to the memory card in a lump; a controller which retrieves the management block from the storage area; the storage area in the nonvolatile semiconductor memory being divided into a plurality of areas and each area having a data block containing a particular page which stores information indicating whether or not the management block is present in the area; and the controller retrieving the management block by referencing the particular page contained in each area.

A method of controlling a semiconductor memory having a storage area including a plurality of data blocks and a management block which stores management information related to a storage medium in a lump, according to an embodiment of the present invention, comprises sequentially searching individual areas constituting the storage area; referencing a particular page in a block which is not a bad block in a search target area; and determining, based on information indicated in the referenced particular page, whether or not the management block is present in an area to which the particular page belongs.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 5A and 5B are diagrams showing the format of a command sent by the host;

FIG. 6 is a diagram showing a comparison of a block write operation assumed by the host with a write operation actually performed by the memory card (large block card);

FIG. 8 is a diagram showing a block format different from that in FIG. 7;

FIG. 12 is a diagram showing an example of the format of the central management block shown in FIG. 11;

FIG. 13 is a table illustrating essential parts of the information shown in FIG. 12;

DETAILED DESCRIPTION OF THE INVENTION

Embodiments of the present invention will be described below with reference to the drawings.

Figure 1:
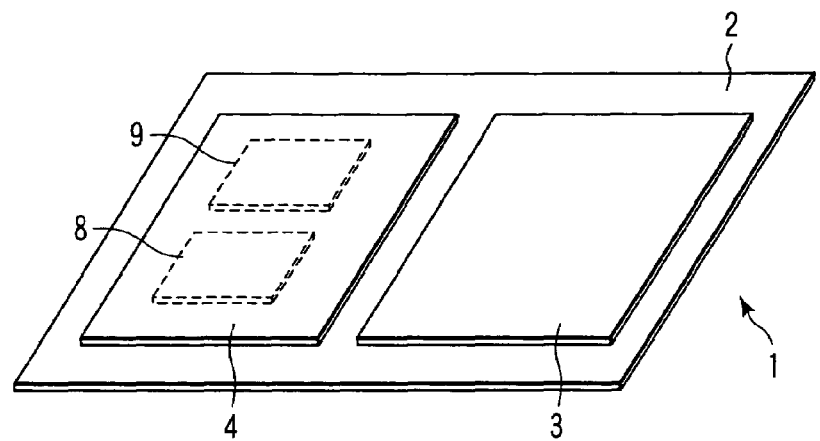
FIG. 1 is a perspective view schematically showing the configuration of a device or the like which is mounted in a memory card according to an embodiment of the present invention.

FIG. 1 is a perspective view schematically showing the configuration of a device or the like which is mounted in a memory card according to an embodiment of the present invention.

As shown in this figure, the memory card 1 according to the present embodiment has a NAND flash memory 3 and a controller 4 arranged on a printed circuit board (PCB) substrate 2. Functional blocks such as a central processing unit (CPU) 8 and a read-only memory (ROM) 9 are mounted in the controller 4. Each of the devices will be described later in detail. The NAND flash memory 3 may be a binary memory in which one-bit information is stored in one memory cell or a multi-valued memory in which information containing more than one bit (for example, 2 bits) is stored in one memory cell. FIG. 1 shows that the NAND flash memory 3 and the controller 4 are arranged on the PCB. However, the NAND flash memory 3 and the controller 4 may be arranged on the same large-scale integration (LSI) circuit board.

The terms "logical block address" and "physical block address, as used herein, mean the logical address and physical address, respectively, of a block itself. Further, the "logical address" and "physical address" principally mean the logical address and physical address of a block itself but indicates that they may be addresses corresponding to a resolution unit smaller than the block unit.

Figure 2:
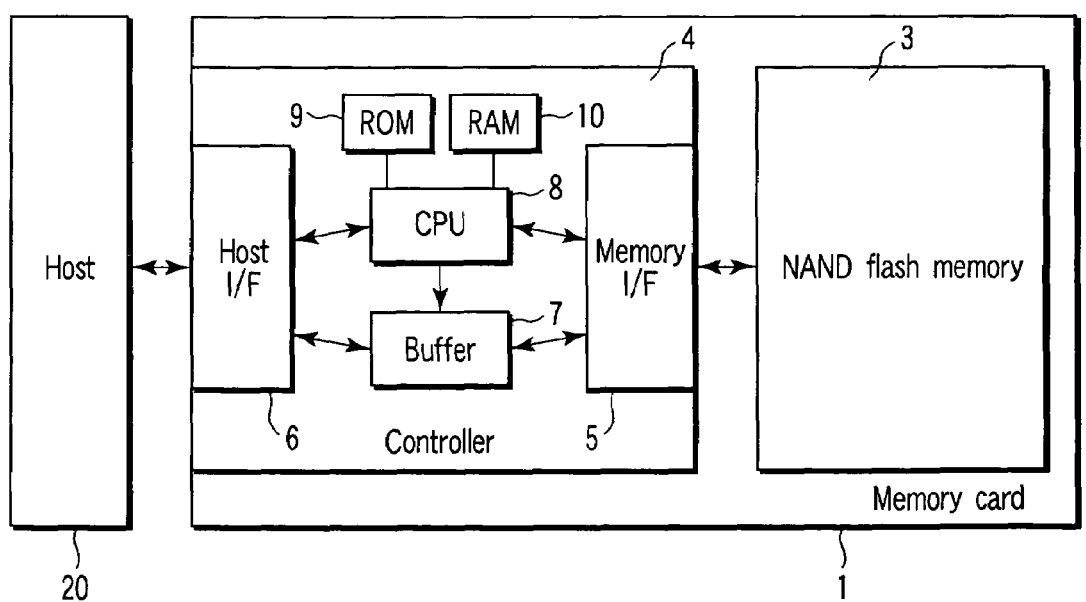
FIG. 2 is a block diagram showing a configuration including a host and the memory card.

FIG. 2 is a block diagram showing a configuration including a host and the memory card. Elements common to FIG. 1 are denoted by the same reference numerals.

A host apparatus (hereinafter referred to as a host) 20 comprises hardware and software (system) required to access a memory card to be connected to the host apparatus. The host 20 is constructed to manage the physical status of the interior of the memory card (which physical block address contains which logical sector address data, or from which block data has already been erased) to directly control the flash memory in the memory card.

Assuming that the NAND flash memory used has an erase block size of 16 Kbytes, the host 20 assigns every 16 Kbytes of logical and physical addresses, and in many cases, sequentially executes write or read accesses on 16 Kbytes of logical addresses (the corresponding commands are issued).

When connected to the host 20, the memory card 1 receives a power supply from the host 20 to operate. The memory card 1 then executes a process corresponding to an access from the host 2. The memory card 1 has the NAND flash memory 3 and the controller 4 as described previously.

The NAND flash memory 3 is a nonvolatile memory for which the erase block size (the block size corresponding to the erase unit) is set at 256 bytes. For example, for each write or read, 16 Kbytes of data is written in or read from the NAND flash memory 3. The NAND flash memory 3 is produced using, for example, a 0.09-μm process technique. That is, the design rule for the NAND flash memory 3 is less than 0.1 μm.

Besides the previously described CPU 8 and ROM 9, the controller 4 is provided with a memory interface section 5, a host interface section 6, a buffer 7, and a random access memory (RAM) 10.

The memory interface section 5 executes an interfacing process between the controller 4 and the NAND flash memory 3. The host interface section 6 executes an interfacing process between the controller 4 and the host 20.

When data sent by the host 20 is written in the NAND flash memory 3, the buffer 7 temporarily stores a specified amount of data (for example, one page of data). When data read from the NAND flash memory 3 is transmitted to the host 20, the buffer also temporarily stores a specified amount of data.

The CPU 8 controls operations of the whole memory card 1. When, for example, the memory card 1 receives a power supply, the CPU 8 loads firmware (a control program) stored in the ROM 9 onto the RAM 10 to execute a predetermined process. The CPU 8 thus creates various tables on the RAM 10, accesses a relevant area on the NAND flash memory 3 in response to a write, read, or erase command from the host 20, or controls a data transfer process through the buffer 7.

The ROM 9 is a memory that stores, for example, control programs used by the CPU 8. The RAM 10 is a memory used as a work area for the CPU 8 to store control programs and various tables.

Figure 3:
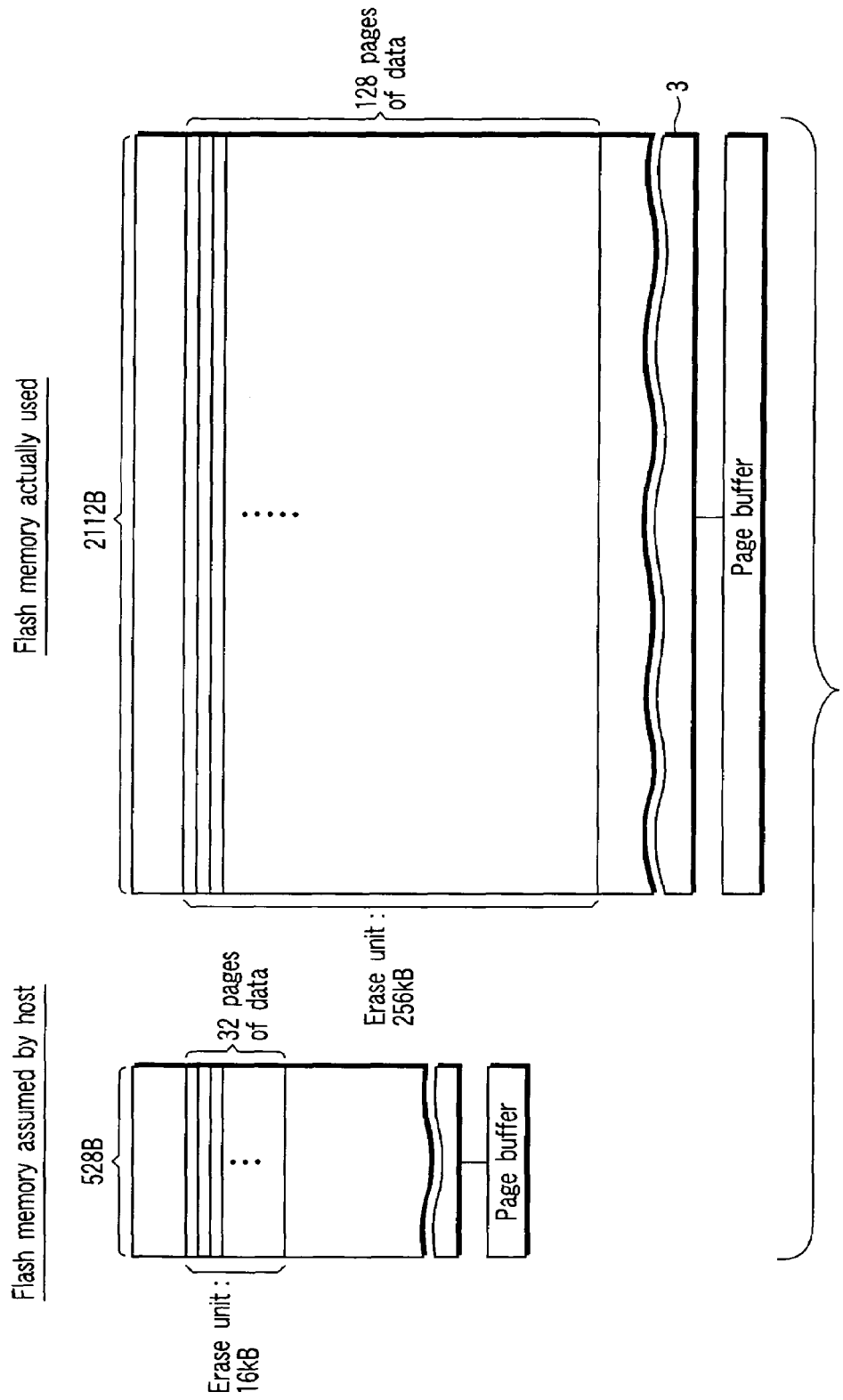
FIG. 3 is a diagram showing a difference in data arrangement between a flash memory assumed by a host system and a flash memory actually used.

FIG. 3 is a diagram showing a difference in data arrangement between a flash memory assumed by the host 20 and the flash memory actually used (that is, the NAND flash memory 3 in the memory card 1).

In the flash memory assumed by the host 20, each page has 528 bytes (512 bytes of data storage section+16 bytes of redundant section), and 32 pages correspond to one erase unit (that is, 16 Kbytes+0.5 Kbytes (in this case, K is 1,024)). A card in which such a flash memory is mounted will hereinafter sometimes be referred to as a "small block card".

On the other hand, in the flash memory 3 actually used, each page has 2,112 bytes (512 bytes of data storage section ×4+10 bytes of redundant section×4+24 bytes of management data storage section), and 128 pages correspond to one erase unit (that is, 256 Kbytes +8 Kbytes. A card in which such a flash memory card is mounted may hereinafter be referred to as a "large block card". For convenience, the erase unit for the small block card will hereinafter be referred to as 16 Kbytes. The erase unit for the large block card will hereinafter be referred to as 256K bytes.

Each of the flash memory assumed by the host 20 and the flash memory 3 actually used comprises a page buffer required to receive or output data from or to the flash memory. The page buffer provided in the flash memory assumed by the host 20 has a storage capacity of 528 bytes (512 bytes and 16 bytes). On the other hand, the page buffer provided in the flash memory actually used has a storage capacity of 2,112 bytes (2,048 bytes and 64 bytes). For each data write or the like, each page buffer receives or outputs one page of data from or to the flash memory, the page corresponding to its storage capacity.

In the example shown in FIG. 3, the flash memory 3 actually used has an erase block size 16 times as large as that of the flash memory assumed by the host 20. However, the present invention is not limited to this aspect. Another configuration is possible provided that the erase block size of the flash memory 3 actually used is substantially an integral multiple of that of the flash memory assumed by the host 20.

To make the large block card a product that is effective in a practical sense, the flash memory 3, shown in FIG. 3, desirably has a storage capacity of 1 Gbits or more. If the flash memory 3 has a storage memory of, for example, 1 Gbits, there are 512 256-Kbyte blocks (erase unit).

FIG. 3 illustrates that the erase unit is a 256-Kbyte block. However, it is also effective in a practical sense to configure the flash memory so that the erase unit is, for example, 128 Kbytes. In this case, there are 1,024 128-Kbyte blocks.

FIG. 3 also shows that the erase block size of the flash memory 3 actually used is larger than that of the flash memory assumed by the host 20. However, the present invention is not limited to this aspect, the flash memory may be configured so that the flash memory 3 actually used has a smaller erase block size than the flash memory assumed by the host 20.

Figure 4:
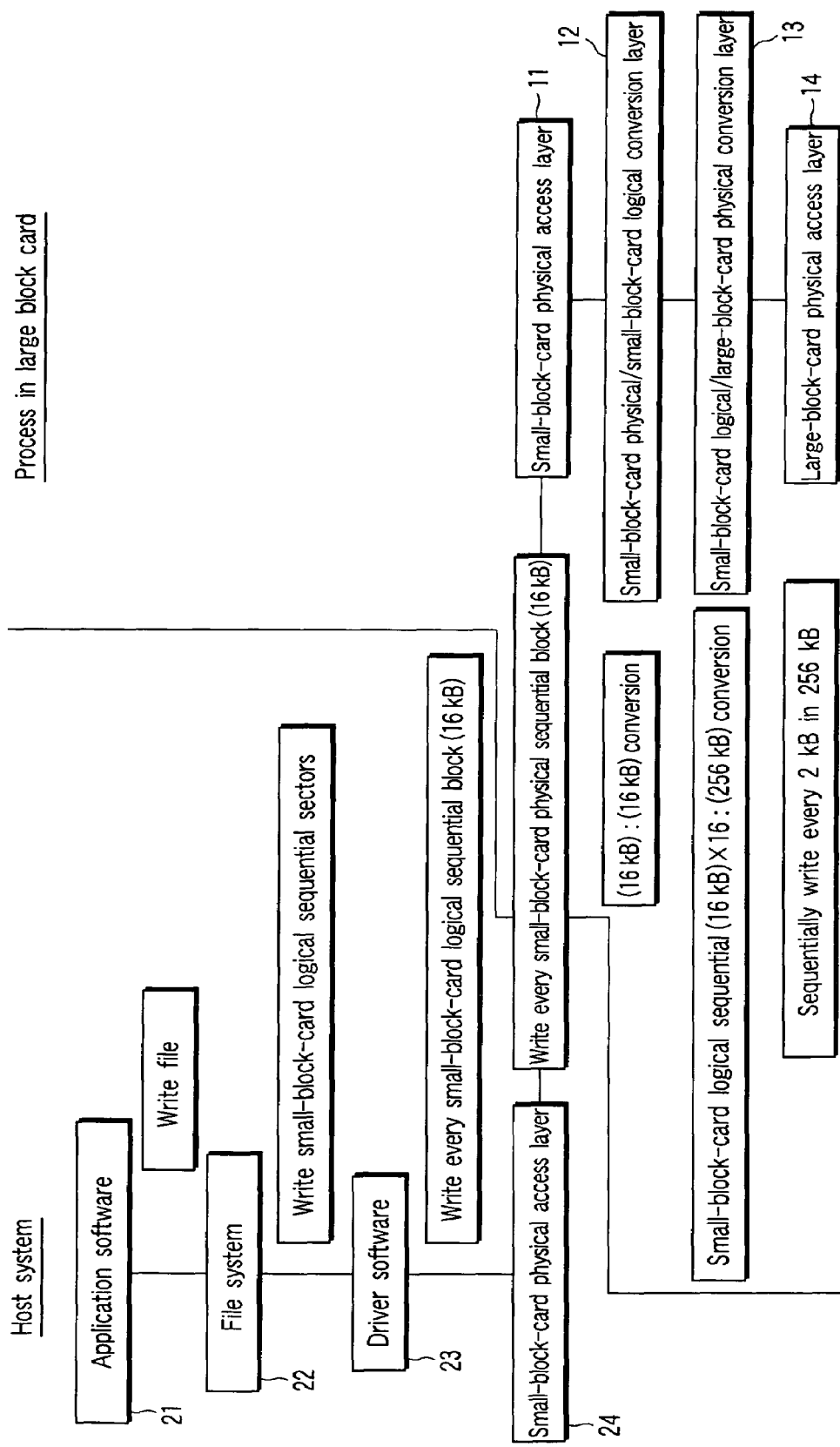
FIG. 4 is a chart showing the communication hierarchy of the host system and of the memory card (large block card)

FIG. 4 is a chart showing the communication hierarchy of the host system and of the memory card (large block card).

The host 20 system has application software 21, a file system 22, driver software 23, and a small-block-card physical access layer 24. On the other hand, the memory card 1 (large block card) has a small-block-card physical access layer 11, a small-block-card physical/small-block-card logical conversion layer 12, a small-block-card logical/large-block-card physical conversion layer 13, and a large-card-block physical access layer 14.

For example, the application software 21 in the host 20 requests the file system 22 to write a file in the memory. Then, the file system 22 instructs the driver software 23 on sequential sector writes on the basis of logical block addresses in the small block card. Upon receiving the instruction, the driver software 23 carries out logical/physical block conversions in order to sequentially write data, that is, one 16-Kbyte block at a time, on the basis of logical block addresses of the small block card. The driver software 23 then issues a random write command based on physical block addresses of the small block card, to the large block card through the small-block-card physical access layer 24. The driver software 23 then executes a data transfer.

For both small and large block cards, a write access is premised on the transmission of a (1) command, a (2) page address (row address), a (3) column address, (4) data, and a (5) program confirmation command in this order in accordance with an appropriate protocol.

Upon receiving a write command with logical block addresses of the small block card from the host 20, the small-block-card physical access layer 11 in the large block card acquires not only the physical block addresses and data but also logical block addresses contained in accompanying data.

The small-block-card physical/small-block-card logical conversion layer 12 has a first table used for a data read or the like to convert physical block addresses (each corresponding to 16-Kbyte block) of the small block card into logical block addresses (each corresponding to 16-Kbyte block) of the small block card. When the small-block-card physical access layer 11 receives a write command to acquire logical block addresses of the small block card, the conversion layer 12 reflects the logical block addresses in the first table. The conversion layer 12 also reflects physical block addresses in the first table.

The small-block-card logical/large-block-card physical conversion layer 13 has a second table used for a data read or the like to convert logical block addresses (each corresponding to sequential 16-Kbyte block×16) of the small block card into physical block addresses (each corresponding to 256-Kbyte physical block) of the large block card. When the small-block-card physical access layer 11 receives a write command to acquire logical block addresses of the small block card, the conversion layer 12 reflects the logical block addresses in the second table.

On the basis of the logical block addresses acquired by the small-block-card physical access layer 11 upon receiving the write command, the large-block-card physical access layer 14 determines how the data is arranged inside the flash memory 3. The large-block-card physical access layer 14 then sequentially writes 16 Kbytes of data in a 256-Kbyte physical block the memory by writing 2 Kbytes (one page) of data during each operation. The large-block-card physical access layer 14 stores the logical and physical block addresses of the small block card which have been acquired, in a predetermined area within a managed data area inside the flash memory 3.

The host 20 thus issues a command based on physical block addresses of the small block card. Accordingly, the large block card carries out management so as to make it possible to determine which 256-Kbyte physical block contains data corresponding to certain physical block addresses of the small block card. Specifically, the large block card manages the correspondences between logical block addresses and physical block addresses for every 16-Kbyte block. The large block card also carries out management so as to make it possible to determine which 256-Kbyte physical block in the large block card contains data corresponding to a 256-Kbyte block of consecutive logical block addresses of the small block card.

FIGS. 5A and 5B are diagrams showing the format of a command sent by the host 20.

A packet for a command sent by the host 20 contains various pieces of information such as command type information (in this case, "write"), addresses (physical block addresses), and data (actual data such as contents and accompanying data (512 bytes+16 bytes)) as shown in FIG. 5A.

In a packet in this format, "logical block addresses" (logical addresses corresponding to a 16-byte block to be accessed) of the small block card are arranged at a predetermined location in the accompanying data as shown in FIG. 5B. The large block card acquires not only the command type information, physical block addresses, and data but also the "logical block addresses". The "logical block addresses" are not added for a read command.

FIG. 6 is a diagram showing a comparison of a block write operation assumed by the host with a write operation actually performed by the memory card 1 (large block card).

When a sequential write operation in 16-Kbyte blocks is performed on the basis of logical addresses of the small block card, the host 20 (the left of the figure) performs a random write operation in 16-Kbyte blocks on the basis of physical block addresses of the small block card.

On the other hand, upon receiving a write command from the host 20, the large block card (the right of the figure) sequentially writes every 16 Kbytes of data in the flash memory 3 on the basis of logical block addresses of the small block card.

As previously described, the host 20 performs a random write operation in 16 Kbytes on the basis of physical addresses for small blocks. Such a random write operation involves many processes of rewriting only a part of a large block (256 Kbytes). The NAND flash memory only allows data to be erased in block units. Accordingly, if a block is partly rewritten, it is necessary to write new data to replace the corresponding part of old data, in a new block from which data has already been erased and then copy the remaining data which is not to be rewritten, from the old block containing the old data to be replaced with the new data, to the new block. In this manner, the process of rewriting only a part of a block involves an operation of copying data that is not to be rewritten (this operation will hereinafter be referred to as a "mixed-up data copy"). Consequently, many processes of rewriting only a part of a block may result in a significant increase in overhead. Thus, in the present embodiment, the large block card reassigns the physical addresses in accordance with the order of the logical addresses obtained from the host 20. This reduces the occurrence of writes to only a part of a block to suppress an increase in overhead.

Figure 7:
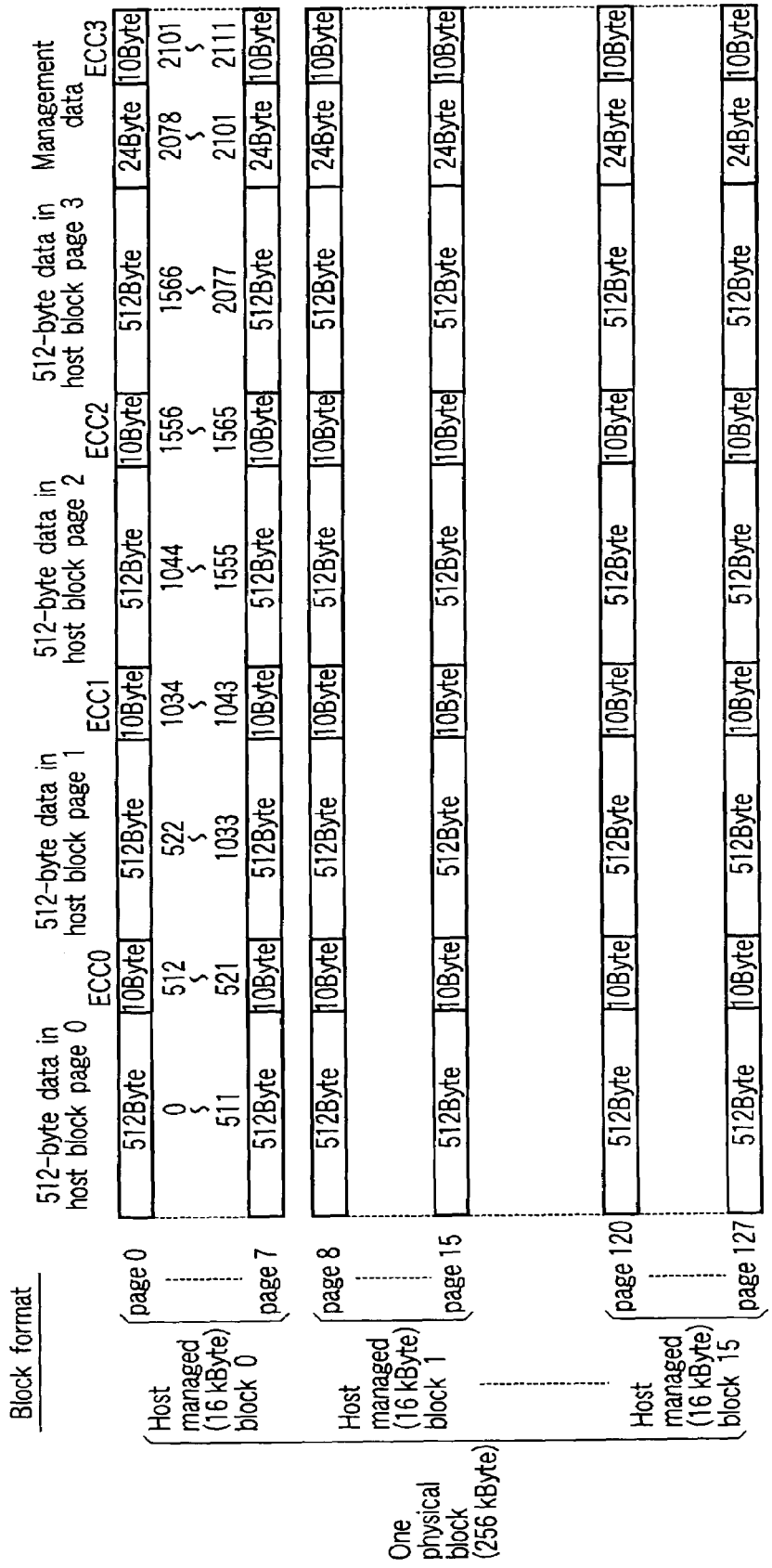
FIG. 7 is a diagram showing the block format of the flash memory in the large block card (for a 256-Kbyte physical block corresponding to an erase unit)

FIG. 7 is a diagram showing the block format of the NAND flash memory 3 in the large block card (for a 256-Kbyte physical block corresponding to an erase unit).

In the large block card, a 256-Kbyte physical block corresponding to an erase unit contains 16 blocks in which data corresponding to 16 Kbytes, corresponding to a unit managed by the host 20, is written (these blocks will hereinafter be referred to as host managed blocks). For a data write, individual data are arranged in the order of the logical block addresses of the small block card.

Each host managed block includes eight pages. Each page contains four 512-byte data areas and 10-byte ECC areas each corresponding to one data area. Further, a 24-byte managed data area is provided after the last (fourth) 512-byte data area in a page. Thus, the last 10-byte ECC area in the page corresponds to both fourth 512-byte data area and 24-byte managed data area.

For example, the last of 128 24-byte managed data areas contained in a 256-byte physical block corresponding to the erase unit stores both address information corresponding to physical block addresses acquired from a command sent by the host 20 (this information will hereinafter be referred to as "host managed physical addresses) and address information corresponding to logical block addresses acquired from the command sent by the host 20 (this information will hereinafter referred to as "host managed logical addresses). The "host managed physical addresses" and "host managed logical block addresses" stored in each 256-Kbyte block are used to create the first table possessed by the small-block-card physical/small-block-card logical conversion layer 12 and the second table possessed by the small-block-card logical/large-block-card physical conversion layer 13 as described in FIG. 4.

Figure 8:
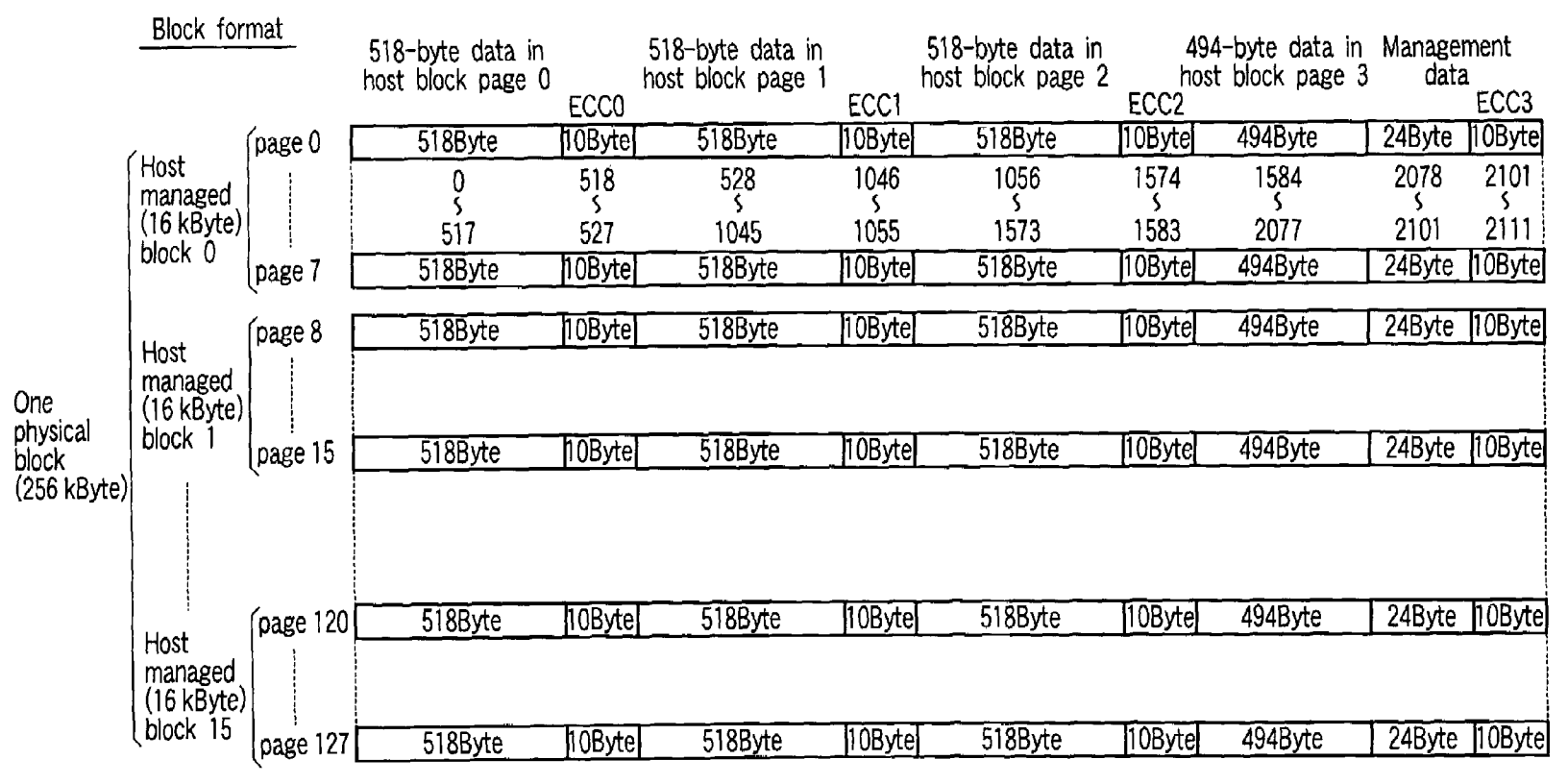

FIG. 8 is a diagram showing an example of a block format different from that shown in FIG. 7.

The block format in FIG. 8 differs from the block format in FIG. 7 in the arrangement of the areas ECC0, ECC1, and ECC2. However, the user data storage capacity of each page is the same for both block formats in FIGS. 7 and 8. That is, in the block format in FIG. 7, each page is provided with the 2048-byte (512 bytes+512 bytes+512 bytes+512 bytes) storage area. On the other hand, in the block format in FIG. 8, each page is provided with a 2048-byte (518 bytes+518 bytes+518 bytes+494 bytes) storage area. The description below is premised on the employment of the block format in FIG. 8.

Figure 9:
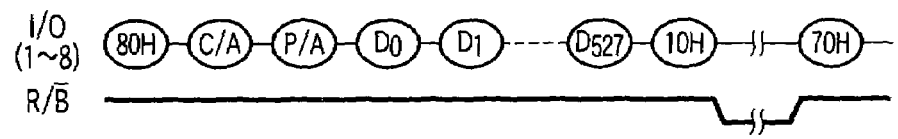
FIG. 9 is a timing chart showing an example of signals to an I/O and R/B pins of the memory card which signals are used when the host executes writes on the memory card according to the present embodiment.

FIG. 9 is a timing chart showing an example of signals to I/O and R/B pins of the memory card which signals are used when the host 20 executes writes on the memory card 1 according to the present embodiment.

The host 20 controls a memory card assuming that the memory card is a nonvolatile memory having a 16-Kbyte erase block size. For example, for a write in the memory card, the host 20 inputs a serial data input command 80H (H denotes a hexadecimal number) to I/O pins 1 to 8. Then, the host 20 inputs a column address C/A and a page address P/A to the I/O pins 1 to 8. The column address C/A and the page address P/A are provided for a virtual physical address space assumed by the host 20 for the memory card 1.

Moreover, the host 20 inputs write data to each of the I/O pins 1 to 8 528 times. Specifically, the host 20 sequentially shifts 528 bits (a total value for all the I/O pins) of data in each of the I/O pins while clocking an input signal to the write enable pin 528 times. Once the data shift-in has been completed, the host 20 inputs a program command 10H to the input pins 1 to 8. In response to this, the memory card outputs a low-level signal to the R/B pin to indicate that the memory card is busy. A predetermined time later, the memory card outputs a high-level signal to the R/B pin to indicate that the memory card is ready.

However, the status of the R/B pin in FIG. 9 only indicates the status of the memory card 1 to the host 20. That is, in FIG. 9, even when the R/B pin indicates a busy status (that is, outputs a low level) in response to the input of the program command 10H, this does not always indicate that an internal write operation (that is, transfer of data from the page buffer to a memory cell array) is actually being performed on the NAND flash memory 3. Even if the R/B pin returns to the ready status, this does not always indicate that an internal write operation on the NAND flash memory 3 has actually been completed.

Figure 10:
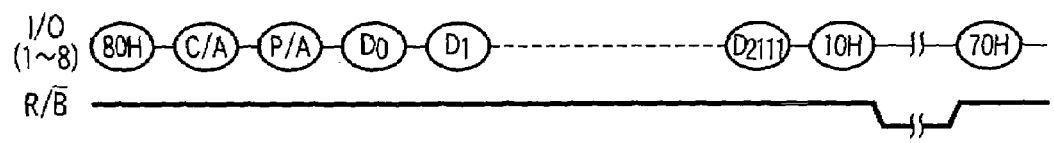
FIG. 10 is a timing chart showing an example of signals for the I/O and R/B pins of a nonvolatile memory in the memory card which signals are used when a controller in the memory card executes writes on the nonvolatile memory in the memory card according to the present embodiment.

FIG. 10 is a timing chart showing an example of signals to the I/O and R/B pins of the NAND flash memory 3 which signals are used when the controller 4 in the memory card 1 executes writes on the NAND flash memory 3 in the memory card 1 according to the present embodiment.

The controller 4 recognizes that the NAND flash memory 3 is nonvolatile and has a 256-Kbyte erase block size. For example, for a write in the NAND flash memory 3, the controller 4 inputs the serial data input command 80H (H denotes a hexadecimal number) to I/O pins 1 to 8. Then, the controller 4 inputs the column address C/A and the page address P/A to the I/O pins 1 to 8. The column address C/A and the page address P/A are provided for a real physical address space assumed by the controller 4 for the NAND flash memory 3. Accordingly, these addresses do not necessarily match the column address C/A and page address P/A in FIG. 9.

Moreover, the controller 4 inputs write data to each of the I/O pins 1 to 8 2,112 times. Specifically, the controller 4 sequentially shifts 2,112 bits (a total value for all the I/O pins) of data in each of the I/O pins while clocking an input signal to the write enable pin 2,112 times. Once the data shift-in has been completed, the controller 4 inputs the program command 10H to the input pins 1 to 8. In response to this, the memory card outputs a low-level signal to the R/B pin to indicate that the memory card is busy. A predetermined time later, the memory card outputs a high-level signal to the R/B pin to indicate that the memory card is ready. The status of the R/B pin in FIG. 10 indicates the actual status of the NAND flash memory 3 to the controller 4.

In FIGS. 9 and 10, previously described, each of the inputs of the column address C/A and page address P/A is shown completed in one cycle. However, the input may require two or more cycles depending on the capacity of the memory card 1 or NAND flash memory 3.

As can be seen in FIGS. 9 and 10, previously described, the time for which the memory card may be busy is restricted. That is, during this time, the controller must write the data and the predetermined time later, it must indicate to the host that the memory card has gotten ready.

In the description below, the physical block addresses and logical block addresses in the flash memory assumed by the host 20 will simply be referred to as "xPBA" and "xLBA", respectively. The physical block addresses in the flash memory 3 will hereinafter simply be referred to as "PBA".

In the present embodiment, the data storage area of the flash memory assumed by the host 20 is divided into a plurality of zones, which are numbered for management. Specifically, a group of 1024 blocks corresponding to physical block addresses xPBA1 to 1023 is defined as Zone0, a group of 1024 blocks corresponding to physical block addresses xPBA1024 to 2047 is defined as Zone1, a group of 1024 blocks corresponding to physical block addresses xPBA2048 to 3071 is defined as Zone2, . . . . Each zone is the associated with 1,000 xLBAs. The physical block address xPBA0 is associated with a block storing a card information structure (CIS) (described later) for the memory card 1.

Figure 11:
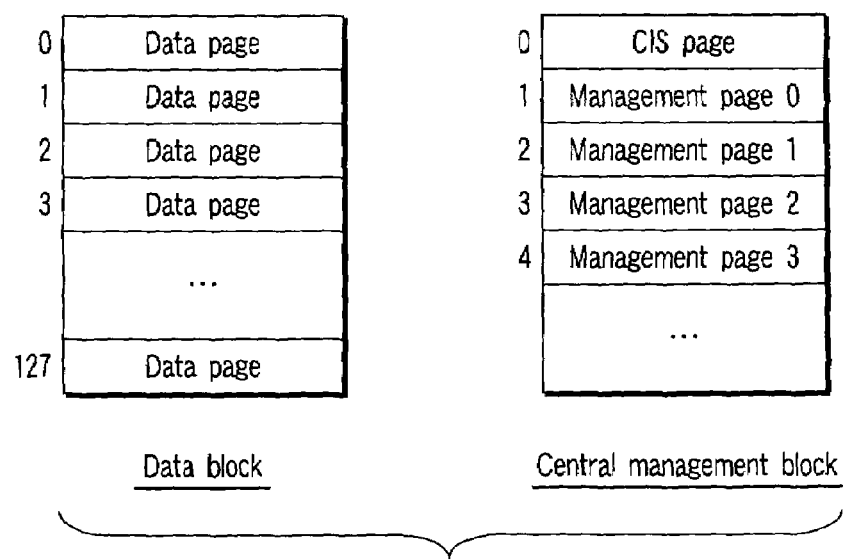
FIG. 11 is a diagram showing the general organization of a data block and a central management block on a flash memory.

FIG. 11 is a diagram showing the general organization of a data block and a central management block on the flash memory 3.

The data block (one physical block) is made up of 128 data pages also shown in FIG. 8, previously described. A plurality of such data blocks are present on the flash memory 3 and are used to store user data (data such as documents, still images, and moving pictures which can be read or written by the user). In a predetermined area in, for example, a final data page of each data block, information on the addresses xPBA and xLBA is stored which corresponds to the address PBA of the data block. This information is used when the address conversion tables are to be created.

On the other hand, the central management block (one physical block) is made up of one CIS (Card Information Structure) page and a plurality of management pages 0, 1, 2, 3, . . . . Only one central management block is present on the flash memory 3. The central management block is a special block that stores various pieces of management information (basically information that cannot be freely read or written by the user and that is used by the host or controller, for example, upon activating the flash memory 3) on the flash memory 3 in a lump. The central management block is provided in one of all physical areas which has the highest robustness. That is, the central management block is provided in one of all physical areas which has the smallest number of ECC errors.

The CIS page of the central management block is used to determine whether or not the flash memory 3 is formatted in accordance with the physical format specification of a predetermined memory card. The management pages 0, 1, 2, 3, . . . store the numbers (Zone Nos.) of the zones to which the individual data blocks belong and the status of errors in each data block. Each management page is used to, in particular, determine the addresses PBA of the data blocks corresponding to a zone pre-specified as a table creation target zone, when the address conversion tables are to be created.

Figure 14:
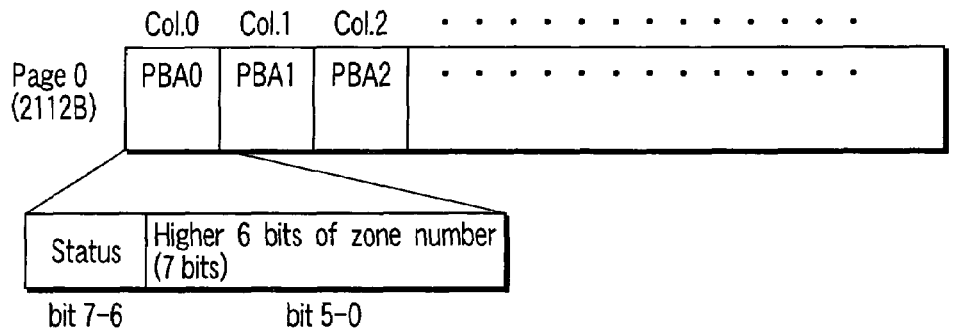
FIG. 14 is a diagram showing an example of the format of columns in a management page 0 shown in FIG. 12.

FIG. 12 is a diagram showing an example of the format of the central management block shown in FIG. 11. FIG. 13 is a table illustrating essential parts of the information shown in FIG. 12. FIG. 14 is a diagram showing an example of the format of each column in the management page 0, shown in FIG. 12. Now, with reference to FIGS. 12 to 14, a detailed description will be given of the CIS page and management pages 0, 1, 2, 3, . . . .

The CIS page in FIG. 12 has various areas represented by "CIS", "CIS-PBA", "identification number", "ID", "empty BLK", "ECC", "Mode", "Max PBA", "Max PPA", "1034B", "4B", and the like. The area "CIS" stores card information structure data (CIS data) to be read by the host 20. The area "CIS-PBA" stores a physical address (xPBA) indicating the position at which the CIS data is stored (the physical address is stored so as to deal with a rewrite of the CIS data possibly executed by the host 20). The area "identification number" stores the identification number of the memory card 1. The area "ID" stores the type of data written in the page and a bad block attribute. The area "empty BLK" stores the address of an empty block from which data has been erased. The area "ECC" stores an ECC corresponding to information on a column address 0-517, an ECC corresponding to information on a column address 528-1045, and an ECC corresponding to information on a column address 1056-2101. The areas "Mode", "Max PBA", "Max PPA", "1034B", and "4B" store various pieces of information used during debugging (a detailed description of theses areas is omitted).

Each of the management pages 0, 1, 2, 3, . . . has a plurality of areas represented by "Assign & Status", "ID", "ECC", "19B, and "4B". The area "Assign & Status" stores, for each data block, the number of a zone assigned to the data block and a status indicating how many ECC errors are present in the data block. The area "ID" stores the type of data written in the page and the bad block attribute. The area "ECC" stores the ECC corresponding to information on the column address 0-517, the ECC corresponding to information on the column address 528-1045, an ECC corresponding to information on a column address 1056-1573, and an ECC corresponding to information on a column address 1584-2101. The areas "19B" and "4B" are empty (unused).

Of all the management pages 0, 1, 2, and 3, for example, the management page 0 will be focused on. As shown in FIG. 14, individual columns Col.0, Col.1, Col.2, . . . constituting the management page 0 are provided with areas corresponding to addresses PBA0, PBA1, PBA2, . . . identifying the individual data blocks.

Each area (1 byte) stores the combination of the above described zone number (6 of 7 bits) and status (2 bits).

Figure 15:
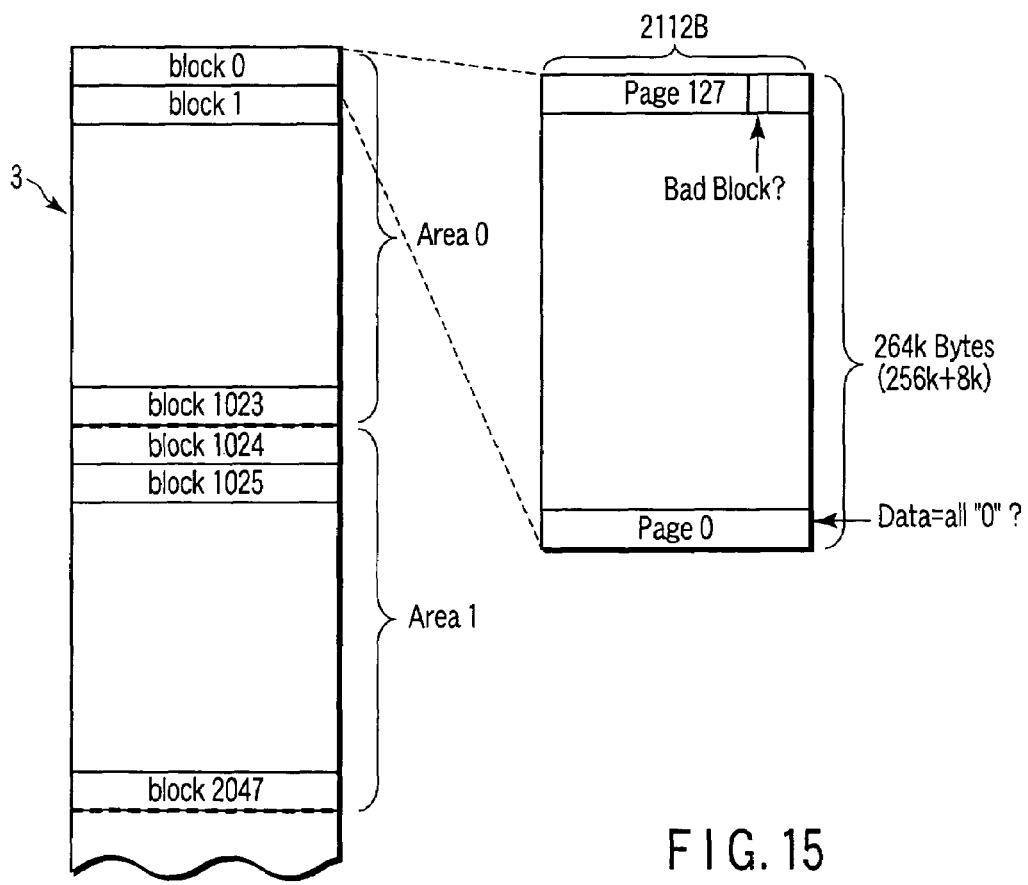
FIG. 15 is a diagram showing an example of the format that enables a central management block to be retrieved in a short time.

FIG. 15 is a diagram showing an example of a format that enables the central management block to be retrieved in a short time.

The storage area of the flash memory 3 is divided into a plurality of areas: Area 0, Area 1, Area2, (preformatted). In the illustrated example, Area0 includes 1,024 blocks (block0 to block1023), Area1 includes 1,024 blocks (block1024 to block2047, . . .

Each area includes a data block containing a particular page (e.g., page0) that stores information indicating whether or not the previously described central management block is present in the area (such a data block will hereinafter be referred to as a "marking block"). That is, one marking block is provided in each area. In the illustrated example, the marking block in Area0 is block0.

For example, the definitions below are provided. If all the columns constituting the particular page0 have a value of 0, the central management block is not present in the area to which the particular page0 belongs. If at least one column has a value of 1, the central management block is present in the area to which the particular page0 belongs.

Further, a predetermined column (for example, col.2097) on page127 in each block is provided with a bit indicating whether or not the block is a bad block (which is not used for data storage).

If the uppermost block in the area is not a bad block, the particular page is provided in the uppermost block. On the other hand, if the uppermost block is a bad block, the particular page is provided in a normal block (not a bad block) succeeding the bad block.

To retrieve the central management block, the controller 4 (see FIGS. 1 and 2) searches for the marking block contained in each area and references the particular page contained in the marking block. Consequently, the central management block can be retrieved in a short time.

Specifically, the controller 4 sequentially searches for the central management block from the uppermost area to the lowermost area. The controller 4 references page127 in the uppermost block in the search target area to determine whether or not the block is a bad block. If the block is not a bad block, the controller 4 considers the uppermost block to be the marking block. The controller 4 then references page0 in the marking block, which is the particular page. On the other hand, if the uppermost block in the search target area is a bad block, the controller 4 determines whether or not the block succeeding the bad block is a bad block by referencing page127 in the block succeeding the bad block. In this manner, the controller 4 sequentially determines whether or not each block in the search target area, from the uppermost block to the lowermost block, to search for a normal uppermost block that is not a bad block. If the controller 4 successfully searches for the uppermost block but is not a bad block, it considers that block to be the marking block. The controller 4 then references page0 in the marking block, which is the particular page. If the referenced particular page indicates the presence of the central management block, the controller 4 searches all the blocks in the area to which the particular page belongs. The controller 4 thus finds and reads the central management block.

Such a retrieval process executed by the controller 4 is controlled through the CPU 8, which executes a control program loaded onto the RAM 10 from the ROM, or the interface section 5.

Figure 16:
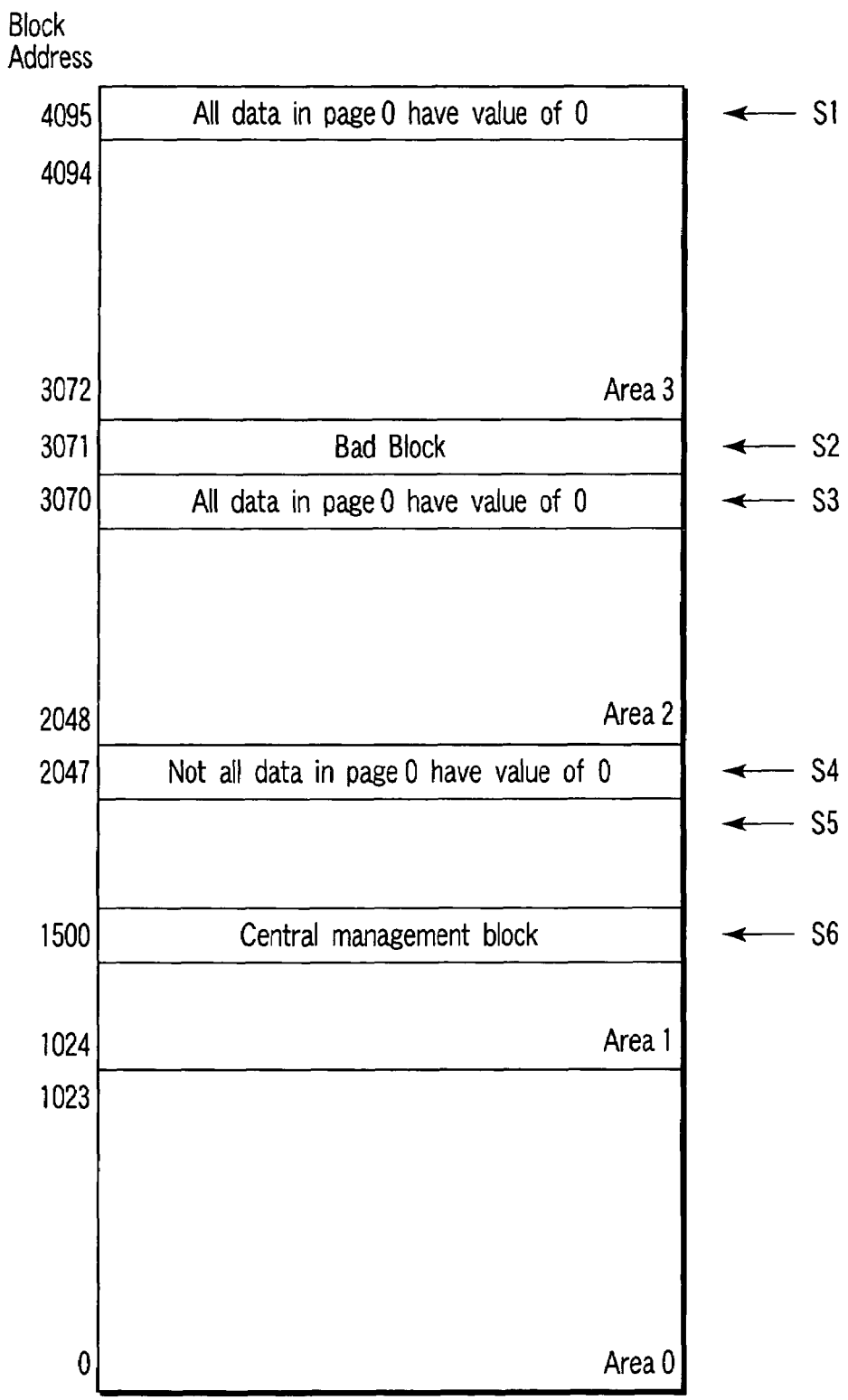
FIG. 16 is a diagram illustrating a specific example of a process in which a controller detects the central management block provided in a certain area.

Now, with reference to FIG. 16, description will be given of a specific example of a process in which the controller 4 detects the central management block provided in a certain area. Assume that the central management block is present in block1500, only block3071 is the bad block.

The controller 4 determines whether or not block4095, the uppermost block of Area3, is a bad block. Since block4095 is not a bad block, the controller 4 determines whether or not all the column data in page0 have a value of 0 (step S1). Since all the column data in page0 have a value of 0, the controller 4 considers that the central management block is not present in Area3. The controller 4 then starts to search the succeeding area.

Then, the controller 4 determines whether or not the uppermost block in Area2, block3071, is a bad block (step S2). Since block3071 is a bad block, the controller 4 determines whether or not the succeeding block (i.e., block3070) is a bad block. Since the succeeding block (i.e., block3070) is not a bad block, the controller 4 determines whether or not all the column data in page0 have a value of 0 (step S3). Since all the column data in page0 have a value of 0, the controller 4 determines that the management block is not present in Area2. The controller 4 then starts to search the succeeding area.

Then, the controller 4 determines whether or not the uppermost block in Area1, block2047, is a bad block. Since block2047 is not a bad block, the controller 4 determines whether or not all the column data in page0 have a value of 0 (step S4). Since not all the column data in page0 have a value of 0 but at least one column has a value of 1, the controller 4 considers that the management block is present in Area1. The controller 4 then sequentially searches for the central management block starting with the uppermost block in Area1 (step S5). The controller 4 detects and reads the central management block in block1500 (step S6).

Figure 17:
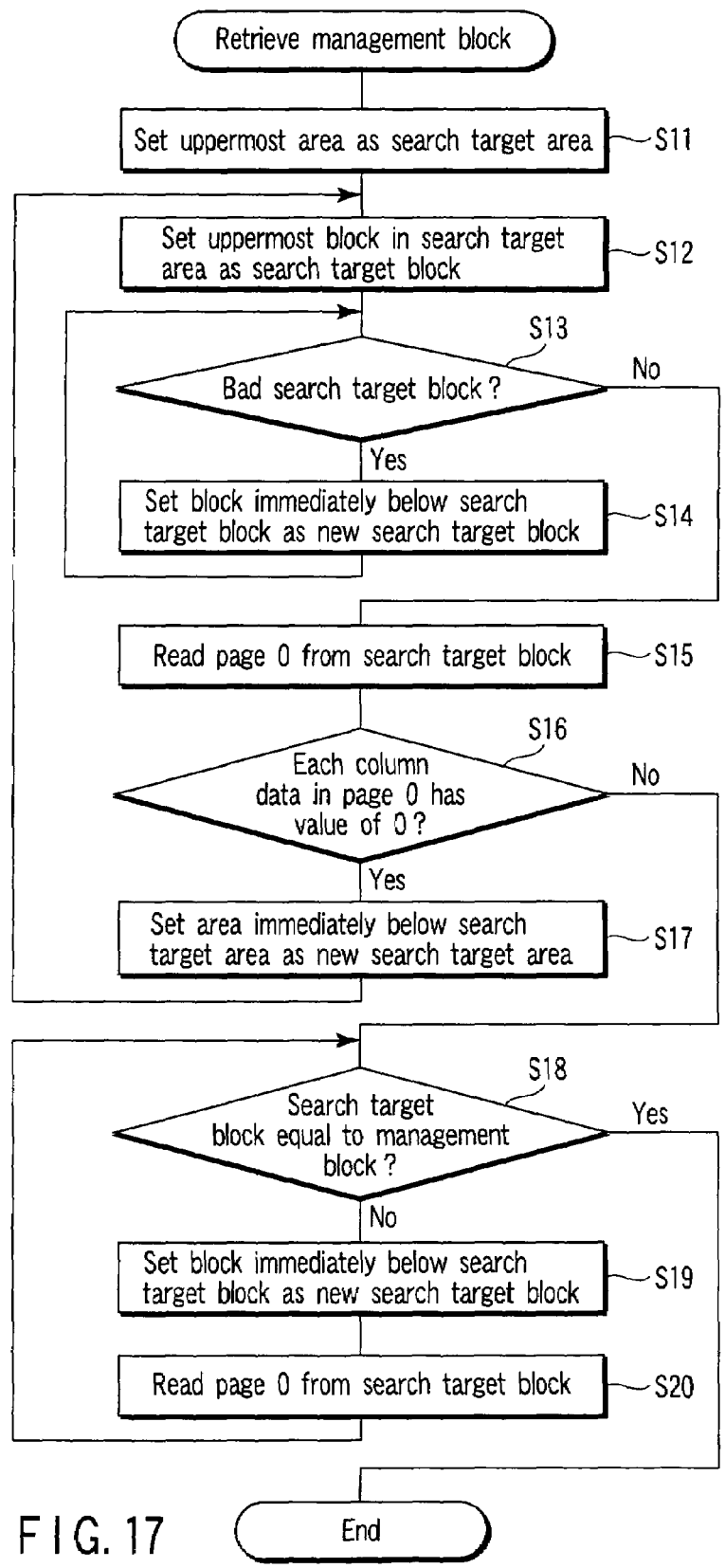
FIG. 17 is a flow chart showing an operation performed by the controller to retrieve the central management block.

Now, with reference to FIG. 17, description will be given of an operation performed by the controller 4 to retrieve the central management block.

For example, when the memory card 1 is powered on, the controller 4 indicates that the memory card is busy. The controller 4 then starts the retrieval process described below.

First, the controller 4 sets the uppermost area as a search target area (step S11) and further sets the uppermost block in the search target area as a search target block (step S12).

The controller 4 determines whether or not the search target block is a bad block (step S13). If the search target block is a bad block (Yes in the step S13), the controller 4 sets the block immediately below the bad block as a search target block (step S14). The controller 4 then repeats the processing in the step S13. On the other hand, if the search target block is not a bad block (No in the step S13), the controller 4 reads page0 from the search target block (step S15).

The controller 4 determines whether or not each column data in the read page0 has a value of 0 (step S16). If all the column data have a value of 0 (Yes in the step S16), the controller 4 considers that the central management block is not present in the search target area. The controller 4 then sets the area immediately below the search target area as a new search target (step S17). The controller 4 then repeats the processing starting with the step S12. On the other hand, if column data having a value of 1 exists (No in the step S16), the controller 4 considers that the central management block is present in the search target area. The controller 4 then sequentially searches for the central management block starting with the uppermost block in the area.

The controller 4 determines whether or not the search target block is the central management block (step S18). If the search target block is not the central management block (No in the step S18), the controller 4 sets the block immediately below the search target block as a new search target (step S19). The controller 4 then reads page0 from the search target block (step S20) and repeats the processing starting with the step S18. On the other hand, if the search target block is the central management block (Yes in the step S18), the controller 4 reads the central management block and transfers required information to the host.

Once the above process is completed, the controller 4 indicates that the memory card is now ready to finish the series of operations.

As described above, according to the present embodiment, the storage area on the flash memory 3 is divided into a plurality of areas. Further, each area is provided with the data block (the marking block) containing the particular page that stores the information indicating whether or not the central management block is present in the area. It is thus possible to immediately determine whether or not the central management block is present in each area. This reduces the time required to retrieve the central management block.

Furthermore, in the above description of the embodiment, management information related to the memory card is managed in a lump by a single central management block, without distribution of the management information. Consequently, all the management information can be placed in one of all the physical areas which is the most robust. This prevents important information from being inadvertently destroyed.

Furthermore, in the above description of the embodiment, the controller 4 carries out management and control (the process of retrieving the central management block and the like) of the associations between the addresses in the semiconductor memory assumed by the host 20 and the addresses in the semiconductor memory actually used. However, the control may be executed by, for example, the driver software 23 in the host 20.

Furthermore, in the above description of the embodiment, the erase block size of the flash memory 3 actually used is larger than that of the flash memory assumed by the host 20. However, of course, the erase block size of the flash memory 3 actually used may be the same as that of the flash memory assumed by the host 20.

Furthermore, the above embodiment has been described using the NAND flash memory as a nonvolatile memory. However, the nonvolatile memory is not limited to the NAND flash memory. Other types of memories are applicable.

As described above in detail, the present invention enables a management block stored in a memory to be retrieved in a short time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonvolatile semiconductor memory comprising:
a storage area including of a plurality of data blocks and a management block which stores management information related to a storage medium in a lump; and
the storage area being divided into a plurality of areas and each area having a data block containing a particular page which stores information indicating whether or not the management block is present in the area.

2. The semiconductor memory according to claim 1, wherein the nonvolatile semiconductor memory is a NAND flash memory.

3. The semiconductor memory according to claim 1, wherein the nonvolatile semiconductor memory has a storage capacity of at least 1 Gbits.

4. The semiconductor memory according to claim 1, wherein the management block is provided in one of physical areas which has the highest robustness.

5. A memory card comprising:
a nonvolatile semiconductor memory having a storage area including a plurality of data blocks and a management block which stores management information related to the memory card in a lump;
a controller which retrieves the management block from the storage area;
the storage area in the nonvolatile semiconductor memory being divided into a plurality of areas and each area having a data block containing a particular page which stores information indicating whether or not the management block is present in the area; and
the controller retrieving the management block by referencing the particular page contained in each area.

6. The memory card according to claim 5, wherein the controller sequentially searches individual areas, and if an uppermost block in a search target area is not a bad block, the controller references the particular page in the uppermost block, and on the other hand, if the uppermost block in the search target area is the bad block, the controller references the particular page in a block which succeeds the bad block and which is not a bad block.

7. The memory card according to claim 5, wherein if all columns constituting the particular page have a value of 0, the management block is not present in an area to which the particular page belongs, and if at least one column has a value of 1, the management block is present in the area to which the particular page belongs.

8. The memory card according to claim 5, wherein the nonvolatile semiconductor memory is a NAND flash memory.

9. The memory card according to claim 5, wherein the nonvolatile semiconductor memory has a storage capacity of at least 1 Gbits.

10. The memory card according to claim 5, wherein the management block is provided in one of physical areas which has the highest robustness.

11. A method of controlling a semiconductor memory having a storage area including a plurality of data blocks and a management block which stores management information related to a storage medium in a lump, the method comprising:
sequentially searching individual areas constituting the storage area;
referencing a particular page in a block which is not a bad block in a search target area; and
determining, based on information indicated in the referenced particular page, whether or not the management block is present in an area to which the particular page belongs.

12. The method of controlling a semiconductor memory according to claim 11, wherein the determination includes determining that the management block is not present in the area to which the particular page belongs if all columns constituting the particular page have a value of 0, and determining that the management block is present in the area to which the particular page belongs if at least one column has a value of 1.

13. A method of controlling a semiconductor memory having a storage area including a plurality of data blocks and a management block which stores management information related to a storage medium in a lump, the method comprising:
sequentially searching individual areas constituting the storage area;
if an uppermost block in a search target area is not a bad block, referencing a particular page in the uppermost block, and on the other hand, if the uppermost block in the search target area is the bad block, referencing a particular page in a block which succeeds the bad block and which is not a bad block; and
determining, based on information indicated in the referenced particular page, whether or not the management block is present in an area to which the particular page belongs.

14. The method of controlling a semiconductor memory according to claim 13, wherein the determination includes determining that the management block is not present in the area to which the particular page belongs if all columns constituting the particular page have a value of 0, and determining that the management block is present in the area to which the particular page belongs if at least one column has a value of 1.

* * * * *